United States Patent
Pickin et al.

(10) Patent No.: US 6,834,618 B2
(45) Date of Patent: Dec. 28, 2004

(54) GATE

(76) Inventors: Christopher Douglas Pickin, 3 Riveroaks Place, Hamilton (NZ); James Arthur Harris, 19 Armagh Street, Hamilton (NZ); John Peter Van Amsterdam, 47B Loydes Drive, Hamilton (NZ)

( * ) Notice: Subject to any disclaimer, the term of this patent is extended or adjusted under 35 U.S.C. 154(b) by 29 days.

(21) Appl. No.: 10/290,518

(22) Filed: Nov. 8, 2002

(65) Prior Publication Data

US 2003/0075116 A1 Apr. 24, 2003

Related U.S. Application Data

(63) Continuation of application No. PCT/NZ01/00075, filed on May 8, 2001.

(30) Foreign Application Priority Data

May 8, 2000 (NZ) ................................. 504404

(51) Int. Cl.[7] .............................................. A01K 15/04
(52) U.S. Cl. .......................................... 119/524; 49/273
(58) Field of Search ................................ 119/524, 520, 119/423; 49/73.1, 104, 110, 366, 371, 273

(56) References Cited

U.S. PATENT DOCUMENTS

| | | | | |
|---|---|---|---|---|
| 552,169 A | * | 12/1895 | Drown | 119/524 |
| 859,901 A | * | 7/1907 | Cline | 49/105 |
| 1,507,066 A | * | 9/1924 | Kahle | 49/117 |
| 1,570,462 A | * | 1/1926 | Cope | 49/168 |
| 2,804,705 A | * | 9/1957 | Lusk | 49/106 |
| 3,742,910 A | * | 7/1973 | Ridding | 119/524 |
| 4,270,312 A | * | 6/1981 | Courtis et al. | 49/385 |
| 4,294,196 A | * | 10/1981 | Larsen | 119/524 |
| 4,567,851 A | * | 2/1986 | Larsen | 119/524 |
| 5,398,450 A | * | 3/1995 | Cacicedo | 49/386 |

* cited by examiner

Primary Examiner—Michael J. Carone
Assistant Examiner—Kimberly S. Smith
(74) Attorney, Agent, or Firm—Lowe Hauptman Gilman & Berner, LLP

(57) ABSTRACT

A gate assembly for an animal passageway has two barriers that, when in use, are in close proximity to each other in a closed position and can be moved in opposing directions to each other to be in an open position. The operation of the gate assembly to the open position is achieved by an operator using an operator-activated control mechanism. At least one barrier is configured so that when in the open position it does not intrude into the passageway and activation of the control mechanism is external to the passageway. The gate assembly is maintained in the open position until the operator operates the control mechanism to close the grate assembly. When the assembly is in the open position one barrier is in an upper position with respect to the other. The barrier are pivotally attached to a support at separate pivot points.

12 Claims, 2 Drawing Sheets

GATE

This is a continuation of Application No. PCT/NZ01/00075 filed on May 8, 2001.

TECHNICAL FIELD

This invention relates to a gate. In particular, this invention relates to the gating system for use in animal husbandry. Reference throughout this specification should now been made to use of the present invention for controlling the passage of animals, and in particular cows, within a milking shed.

However, this should not necessarily be seen to be a limitation on the present invention.

BACKGROUND ART

Gating systems for controlling the flow of cattle within milking sheds are well known within the Dairy Industry.

Historically, one of the better designs available was a single, counter-balanced gate, with a single pivot point located towards the top of the gate, and rotated around a horizontal axis.

A contemporary example of a single counterbalanced gate would be U.S. Pat. No. 4,567,851. However, whilst fairly effective, this design does have a number of drawbacks.

The opening of the gate was controlled by an operating lever which was used to swing the gate upwards around its pivot point.

A counter-balance weight was fitted to the gate assembly in order to overcome the weight of the gate and thereby assist the operator during the opening and closing of the gate.

When the milking parlour is in operation the environment is generally damp and therefore corrosion is an ever present problem.

Corrosion of the counter balance weight assembly is of particular concern as if the weight was to be come detached from the gate assembly it could be particularly hazardous for the operator.

Another significant problem with a single pivoting gate is that it must be of a considerable size in order to block the passage of animals and there must therefore be a large movement of the gate in order to clear the passage when the gate is opened.

This large movement entails that there is a substantial clearance area to the side of the gate assembly in order to accommodate the gate during its movement. This therefore restricts the size of the building in which the gate assembly can be used.

A further problem with this style of gate is that the pivot point, about which the gate rotates, is generally clamped around a top bar of the mounting frame.

This is generally accepted to be a weak point of the system as when the gate is leant on or banged against by an animal this bracket can either rotate or be damaged thereby rendering the gate either difficult to operate or ineffective.

The pitswing guillotine gate system was devised in order to over come some of these problems.

The pitswing gate system uses two similarly sized gates, which move in opposite directions to one another when opening and closing.

The pitswing gate system replaced the counter balance weight with a spring-assisted action for opening and closing, thereby removing this problem.

Whilst improving some of the problems found with the foregoing systems, the pitswing gate system introduced a new problem in that the animals would often attempt to force their way through the gap between the two gates, or sometimes would attempt to climb over the gates.

A further problem found with the pendulum gate system is that quite often animals that were close to the gate when they opened would need to back up in order to clear the gate and continue along the passageway.

Whilst the pitswing gate assembly reduced the amount of clearance needed in order for the gates to operate, the gate which moves away from the pit still requires a considerable area in which to operate properly.

A further problem introduced by the pitswing gate assembly is that the control and linking mechanism for the two gates is constructed of several elements and is quite complicated in its operation.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a gate assembly for a passageway having two barriers, wherein the barriers are in close proximity to each other when in a closed position, and can be moved in opposing directions to each other to be in an open position, characterised in that at least one barrier is configured so that when in the open position it does not intrude into the passageway.

It should be appreciated that the passageway within the present invention refers to the animal walkway within a milking shed used to gain access to the milking stalls and to exit the building.

This should not however be seen to be a limitation upon the present invention as the gating system may be used in other enclosures.

The closed position used for the present invention should be understood to mean when the gates are at their lowest and closest position.

It should also be understood that the open position is when the gates are at their highest position.

According to another aspect of the present invention there is provided a gate assembly for a passageway, wherein the barriers are in close proximity to each other when in a closed position, and can be moved in opposing directions to each other to be in an open position, characterised in that at least one barrier has a supporting member which extends directly from the barrier through to a control mechanism which is used for opening and closing the gate assembly.

In preferred embodiments of the present invention the supporting member is constructed as part of a barrier and is mounted onto at least one pivot point, with the other end of the supporting member connecting directly to the operator-activated control mechanism.

In preferred embodiments of the present invention the control mechanism is constructed of a rod with at least one handle along its length, the handle is used to partially rotate the rod in order to open or close the barriers.

The rod used in the control mechanism is linked to the supporting member via a linking assembly.

It should be understood that in most embodiments of the present invention the control assembly will extend far enough along the wall of the pit so that the pit operator can control the gate from anywhere within the pit.

It is envisaged that in preferred embodiments of the present invention each barrier will be mounted upon a separate pivot point, with the two barriers connected by an adjustable linking rod.

It should be understood that in some preferred embodiments the pivot points are mounted upon an angle-iron assembly which is generally situated above head height of the animals using the passageway.

The barrier closest to the pit has had its outermost top corner reshaped in order that when in the open position the gate completely clears the passageway.

It should be further appreciated that the barrier closest to the pit has the bottom corners chamfered.

For the purposes of this specification the term "chamfered" shall be understood to mean "substantially curved".

The bottom corner nearest to the pit is chamfered in order that it extends less distance when in the open position.

This has the advantage that the operator has more room to pass the open gate assembly, this is of particular importance when there is a gate assembly either side of the pit.

A further advantage to the chamfered corner is that the assembly can fit into a smaller building, if necessary the appropriate corner can also be chamfered on the barrier furthest from the pit.

The barrier closest to the pit also has its bottom corner furthest from the pit chamfered.

This has the advantage that it provides more clearance from the ground when the barrier is being opened and closed. This also means that the barrier can be mounted in a lower position relative to the ground than would otherwise be possible.

The outermost barrier has had its inner edge reshaped to form a more sloping profile when in the closed position so that it will give greater clearance of the passageway when in its open position.

The aforementioned reshaping of the barriers overcomes the problem within the prior art in that some animals had to back up within the passageway in order to clear the barriers.

The present invention overcomes this problem as there is now adequate clearance for all the animals to progress through the passageway without having to negotiate around any part of the barrier.

It can be seen that the present invention has other advantages over the prior art, the most significant being that the barriers open wider and higher than any of the previous gating systems, and also take up less room in the open position than with the standard pitswing gate.

Another advantage of the present invention is that the one piece linking system between the two barriers is less complicated and more durable than those used with other pitswing gating systems and therefore also requires less maintenance.

A further advantage is that due to the inclusion of a box-section assembly, rather than normal tubular assembly, the pivot mounting assembly is also far more durable.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
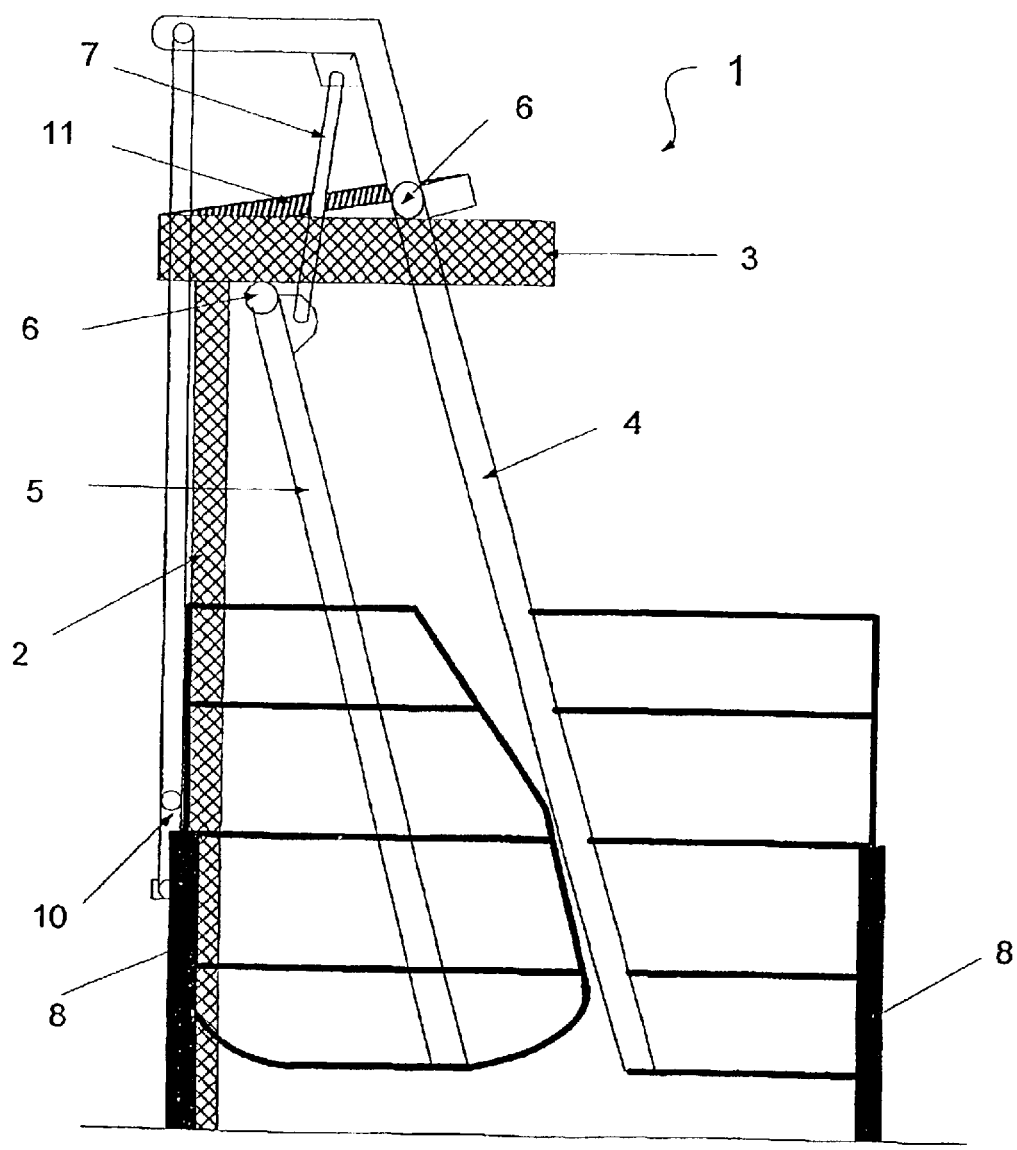
FIG. 1 is a diagrammatical representation of one preferred embodiment of the present invention in its closed position.

With respect to the figures, there is illustrated a preferred embodiment of the present invention generally indicated by arrow 1.

The gate assembly 1 includes a support stanchion 2 to which the box section cage 3 is mounted.

The outer gate 4 and inner gate 5 are mounted to the box section cage 3 via pivot 6.

The gates 4, 5, are joined via an adjustable linking rod 7.

The gate assembly 1 can be fitted with a set of restraining struts 8 in order to ensure an animal cannot force the gates 4, 5, forward and thereby damage the gate assembly 1.

The operator controlled gate activation lever 10 is connected to the gates 4, 5, via an adjustable linking rod 9.

The weight of the gates is counterbalanced by a spring 11, which is mounted between the box-section cage 3 and the outer gate 4.

Figure 2:
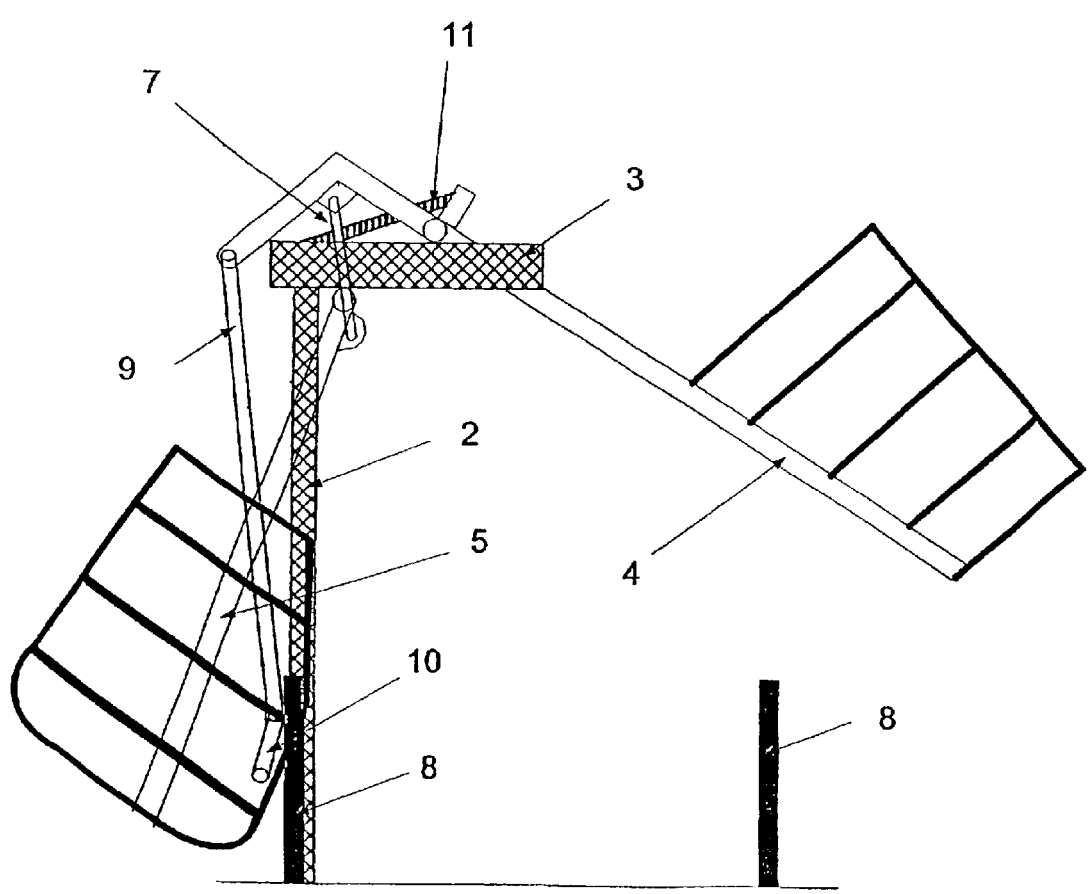
FIG. 2 is a diagrammatical representation of one preferred embodiment of the present invention in its open position.

FIG. 2 shows the gate assembly 1 in the open position, highlighting how the inner gate 5 withdraws from the passageway so that its inner edge is level with the support stanchion 2.

The outer gate 4 is raised high enough and wide enough in order that it does not restrict the flow of animals through the passageway.

Aspects of the present invention have been described by way of example only and it should be appreciated that modifications and additions may be made thereto without departing from the scope thereof.

What is claimed is:

1. A gate assembly for an animal passageway, said gate assembly comprising two pivoting barriers and an operator-activated control mechanism;

wherein, when in use, the barriers are in close proximity to each other when in a closed position in order to prevent the egress of an animal, and are moveable in opposing directions to each other, in a substantially vertical plane, to be in an open position to allow the egress of an animal;

wherein the operation of the gate assembly to the open position is achieved by an operator using the operator-activated control mechanism;

wherein at least one barrier is configured so that when in the open position said at least one barrier does not intrude into the passageway and activation of the control mechanism is external to the passageway, and the gate assembly is maintained in the open position until the operator operates the control mechanism to close the gate assembly wherein when the assembly is in the open position one barrier is in an upper position with respect to the other; and wherein a handle of the control mechanism is located in a pit to one side of the gate assembly and the barrier closest to the pit has an outermost top corner shaped in such a way that when in the open position the gate completely clears the passageway.

2. A gate assembly as claimed in claim 1, wherein the barrier mounted closest to the pit has a bottom corner furthest from the pit chamfered in order to provide more clearance from the ground when the barrier is opened and closed, thereby allowing the barrier to be mounted in a lower position relative to the ground then would otherwise be possible.

3. A gate assembly as claimed in claim 2, wherein the barrier mounted closest to the pit has another bottom corner nearest to the pit chamfered so as to extend less distance into the pit when the gate is in the open position, thereby improving operator access past the barrier.

4. A gate assembly as claimed in claim 3, wherein the other barrier has an inner edge shaped to form a sloping profile so that said other barrier will give greater clearance of the passageway when in the open position.

5. A gate assembly for an animal passageway, said gate assembly comprising:

a stationary support;

first and second pivoting barriers being pivotally mounted on said stationary support at first and second pivot points, respectively; and an operator-activated control mechanism;

wherein said gate assembly has a closed position when the barriers are in close proximity to each other in order to prevent the egress of an animal, and an open position when the barriers are swung in opposing directions to each other to allow the egress of an animal; and wherein each of said barriers includes an enlarged barrier portion positioned below head height of animals using the passageway when said gale assembly is in the closed position; and an arm portion extending from the barrier portion towards the support and being pivotally mounted on the respective pivot point.

6. A gate assembly as claimed in claim 5, further comprising a spring connecting the arm portion of the second barrier with the stationary support.

7. A gate assembly as claimed m claim 5, further comprising a connecting element linking the arm portions of the barriers with each other.

8. A gate assembly as claimed in claim 7, wherein the arm portion of the second barrier is pivotally attached to a lever of the control mechanism.

9. A gate assembly as claimed in claim 5, wherein the arm portion of the second barrier has opposite ends one of which is attached to the respective barrier portion while the other is pivotally attached to a lever of the control mechanism, the second pivot point being located between said opposite ends.

10. A gate assembly as claimed in claim 9, further comprising a spring connecting the arm portion of the second barrier with the stationary support and a rod linking the arm portions of the barriers with each other.

11. A gate assembly as claimed in claim 5, wherein said stationary support includes an upright member positioned at a side of the passageway transverse member positioned at a top end of said upright member; and the first barrier pivots about the first pivot point towards the uptight member when the gate assembly moves from the closed position to the open position so that the barrier portion of the first barrier completely clears the passageway in the open position.

12. A gate assembly as claimed in claim 5, wherein the barrier portions of said first and second barriers are about the same size.

* * * * *